United States Patent [19]

Knobel et al.

[11] Patent Number: 4,618,630

[45] Date of Patent: Oct. 21, 1986

[54] ORGANIC POLYMER COMPOSITION CONTAINING AN ANTISTATIC AGENT COMPRISING A NONVOLATILE IONIZABLE METAL SALT AND A SALT OR ESTER OF A CARBOXYLIC ACID

[75] Inventors: Thomas M. Knobel; Earl E. Kennedy; Mary A. Walker, all of Lake Jackson, Tex.

[73] Assignee: The Dow Chemical Co., Midland, Mich.

[21] Appl. No.: 751,351

[22] Filed: Jul. 2, 1985

Related U.S. Application Data

[63] Continuation-in-part of Ser. No. 644,586, Aug. 27, 1984, abandoned.

[51] Int. Cl.[4] ............................................. C08G 18/14

[52] U.S. Cl. ...................................... 521/105; 252/182; 521/114; 521/116; 521/120; 521/123; 521/124; 521/125; 521/126; 521/130; 524/184; 524/285; 524/295; 524/296; 524/297; 524/298; 524/300; 524/306; 524/311; 524/312; 524/313; 524/314; 524/315; 524/394; 524/395; 524/397; 524/398; 524/775; 524/776; 524/399; 524/777; 524/778; 524/400; 524/701; 524/760; 524/773; 524/774

[58] Field of Search ............... 521/105, 114, 116, 120, 521/123, 124, 125, 126, 130; 252/182; 524/184, 285, 295, 296, 297, 298, 300, 306, 311, 312, 313, 314, 315, 394, 396, 397, 398, 399, 400, 701, 760, 773, 774, 775, 776, 777, 778, 910, 912

[56] References Cited

U.S. PATENT DOCUMENTS

| | | | |
|---|---|---|---|
| 3,461,153 | 8/1969 | Tholstrup et al. | 560/3 |
| 3,787,327 | 1/1974 | Emrick | 252/316 |
| 4,058,663 | 11/1977 | Black | 560/3 |
| 4,438,223 | 3/1984 | Hunter | 521/92 |

Primary Examiner—Maurice J. Welsh

[57] ABSTRACT

An antistatic additive for polymers, particularly polyurethanes is disclosed comprising an ionizable metal salt and an enhancer comprising a non-ionizable salt or ester of an organic acid.

29 Claims, No Drawings

ORGANIC POLYMER COMPOSITION CONTAINING AN ANTISTATIC AGENT COMPRISING A NONVOLATILE IONIZABLE METAL SALT AND A SALT OR ESTER OF A CARBOXYLIC ACID

CROSS REFERENCE TO THE RELATED APPLICATION

This application is a continuation-in-part of application Ser. No. 644,586, filed Aug. 27, 1984, and now abandoned.

BACKGROUND OF THE INVENTION

This invention relates to an antistatic agents for polymers.

Most organic polymers are poor conductors of electricity. As such, they cannot be satisfactorily used without modification in applications which require a conductive or semi-conductive material, such as static dissipative materials.

Due to their beneficial properties such as low cost, easy processability, good strength and light weight, it is often desirable to substitute polymeric materials into applications which in the past required metals or other materials. Accordingly, it has been attempted to prepare semi-conductive or conductive polymers.

It is known, for example, to incorporate conductive fibers, particulates or powders into a polymer in order to increase its conductivity. Although good conductivity can be achieved in this manner, the high loadings of filler material (generally 20% or more) needed to obtain such conductivity greatly alter the properties of the polymer, often making it unsuitable for its desired purpose. In addition, such highly filled polymers are often much more expensive than the unfilled polymer. Yet another problem encountered with certain such fillers, especially fibers, is they often break, oxidize or otherwise lose their effectiveness over time.

It is also known to treat the surfaces of polymers with amines or quaternary ammonium compounds to render them antistatic. However, such treatments are often removed from the polymer during its normal use, causing the polymer to lose its antistatic properties.

Another approach has been to incorporate ionic salts into a polymer to increase its conductivity. For example, in Dupon et al. *J. Elec. Chem. Soc.* 128:715 (1981) it is taught to incorporate salts such as sodium thiocyanate into a high molecular weight poly(ethylene oxide) to increase its conductivity. French Pat. Nos. 2,442,513-4 demonstrate the dissolution of mixed alkaki metal thiocyanate salts into poly(alkylene oxide) polymers for the same reason. In these references, the concentration of salt is generally at least about 5 weight percent, and is preferably as high as about 25 weight percent. Such a high level of salt often imparts undesirable properties to the polymer, such as sensitivity to water. When such levels of salts are employed in a flexible polyurethane foam, the foam often fails, prunes or collapses due to the formation of undesired closed cells.

Although inclusion of these salts has improved the conductivity of the polymers, it would be desirable from the standpoint of utility and cost to further increase the conductivity of the polymer while minimizing the salt content.

SUMMARY OF THE INVENTION

The present invention is, in one aspect, an organic polymer composition comprising an organic polymer having dispersed therein
(a) a non-volatile, ionizable metal salt and
(b) an enhancer comprising a salt or ester of a carboxylic acid which is miscible with said organic polymer and in which said metal salt is soluble, component (a) and (b) being present in an amount sufficient to increase the conductivity of said organic polymer.

In another aspect, this invention is an additive for increasing the conducitivity of an organic polymer which comprises
(a) a non-volatile, ionizable metal salt and
(b) an enhancer comprising a salt or ester of a carboxylic acid in which said metal salt is soluble, which enhancer increases the conductivity of an organic polymer containing said ionizable salt, but which does not itself substantially increase the conductivity of said organic polymer in the absence of said ionizable salt.

It has been found that by employing a metal salt and enhancer as decribed herein, a substantial increase in the conductivity of an organic polymer is obtained. The amount of conductivity increases.

DETAILED DESCRIPTION OF THE INVENTION

The additive of this invention comprises, as one component, an ionizable salt. Said salt is one containing at least one metal cation which is in ionic association with at least one anion. By ionizable, it is meant that the salt is one which provides mobile ions in the presence of an electric field.

The cation can be any metal which forms an ionizable salt with one or more anions, including those in Row 2, groups IA and IIA; Row 3, groups IA, IIA and IIIA; Row 4, groups IA-IVA and IB-VIII B; Rows 5 and 6, groups IA-VA and IB-VIII B; and the lanthanide series in the Periodic Table of the Elements. Preferably, the metal is an alkali metal, an alkaline earth metal, Co, Ni, Fe, Cu, Cd, Zn, Sn, Al or Ag.

The anion is any which forms an ionizable salt with the metal cation. The anion is advantageously the conjugate base of an inorganic acid or a $C_2$-$C_4$ carboxylic acid. Suitable ions include, for example, the halides, i.e. $F^-$, $Cl^-$, $Br^-$, and $I^-$; $NO_3^-$, $SCN^-$, $SO_4^{2-}$, $HSO_4^-$, $SO_3^{2-}$, $HSO_3^-$, $ClO_4^-$, $CO_3^{2-}$, $PO_4^{3-}$, $H_2PO_4^-$, $HPO_4^{2-}$, $PO_3^{3-}$, $HPO_3^{2-}$, $H_2PO_3^-$, acetate, tetraorganoboride, particularly tetraalkyl and tetraphenylboride and the like. Of these, the halides, especially $Cl^-$, $Br^-$ and $I^-$; $SCN^-$; the tetraorganoborides and acetates are preferred on the basis of generally better performance. Most preferred are $SCN^-$ and tetraphenylboride ion, which are less reactive with metals, water or other materials which are often present in the polymer or come in contact with the polymer than are most other anions.

Exemplary ionizable salts include, for example, zinc chloride, copper chloride, cobalt chloride, tin chloride, lithium chloride, iron chloride, magnesium chloride, potassium iodide, sodium iodide, lithium nitrate, cobalt nitrate, sodium acetate, cadmium acetate, zinc acetate, antimony trifluoride, sodium thiocyanate, lithium thiocyanate, potassium thiocyanate, sodium tetraphenylboride, potassium tetraphenylboride and the like. Most preferred are the alkali metal thiocyanate salts and tetraphenylboride salts.

Another critical components of the additive is an enhancer. The enhancer comprises a salt or ester of a carboxylic acid in which the metal salt is soluble or dispersible and which does not substantially increase the conductivity of the polymer in the absence of the ionizable salt, but substantially increases the conductivity of the polymer containing the ionizable salt.

The enhancer is considered not to substantially increase the conductivity of a polymer in the absence of an ionizable salt if the conductivity of the polymer containing the enhancer is not more than 100 times that of the polymer alone, if the polymer containing the enhancer (but not ionizable salt) is too nonconductive to be measured for static dissipation according to the test described herein, or if the polymer containing the enhancer (but no ionizable salt) dissipates 99% of an applied static charge in 60 seconds or greater.

Suitable enhancers include salts or esters of an organic acid. Advantageously, said salt or ester contains about 6-30 carbon atoms. Preferably, the salt is one of a $C_6$-$C_{30}$ carboxylic acid represented by the structure.

(I)

wherein M is a metal ion, n is a number representing the valence of the metal ion and R is an organic radical containing 5-29 carbon atoms.

The group R advantageously is a $C_8$-$C_{22}$, preferably $C_{12}$-$C_{22}$ aliphatic hydrocarbyl group. More preferably, the salt is a fatty acid salt, and is most preferably an alkali metal salt of a fatty acid. Suitable as the salt of a $C_{6-30}$ carboxylic acid are, for example, sodium oleate, potassium oleate, sodium stearate, potassium stearate, sodium laurate, potassium laurate, sodium linoleate, and the like.

Suitable esters include those represented by the structure

(II)

wherein each $R^1$ is independently an inertly substituted organic group, m is a number from about 1 to 3, preferably 2 and $R^2$ is an inertly substituted organic radical containing about 4-29 carbon atoms. Preferred are esters of dicarboxylic acids having from about 6 to 20 carbon esters.

The group $R^2$ can be aliphatic, cycloaliphatic, aromatic, aliphatic-substituted aromatic, aromatic-substituted aliphatic, and the like. Preferably, however, the group $R^2$ is an inertly substituted aliphatic hydrocarbyl group or an inertly substituted aromatic group.

By "inertly substituted", it is meant that the group or molecule referred to contains no substituent groups which interfere with the enhancing function of the group or molecule, undesirably reacts with the polymer in which it is employed, with other components therein, or significantly interferes with the preparation of such polymer its subsequent processing, or its properties. Suitable inert substitutent groups which may be present in the enhancer include, for example ester, ketone, ether or carboxylic acid groups, aromatic groups, tertiary amine groups, carbon-carbon double bonds, halogen, and the like. The enhancer may, if desired, contain a functional group such as an isocyanate group or hydroxyl group which can react with the polymer to bond the enhancer to the polymer network.

When $R^2$ is an aliphatic hydrocarbyl group, it preferably contains 5-21 carbon atoms, and more preferably 5-11 carbon atoms, when the acid is monofunctional (i.e. m is 1) and from about 4-20, preferably 4-10 carbon atoms when the acid is difunctional (i.e. m is 2). In such case, the carboxylic acid is preferably a fatty acid.

When the group $R^2$ is an inertly substituted aromatic group it advantageously contains one or more aromatic rings which may contain aliphatic side chains. Preferably, when $R^2$ is an aromatic group, it contains from about 6-22 carbon atoms, more preferably 6-12 carbon atoms (including those in side chains, if any). Most preferably, the group $R^2$, when aromatic, is a phenyl group and the ester is one of benzoic, phthalic or terephthalic acid. When a diester such as represented in Structure III is used, the $R^2$ groups are most preferably inertly substituted aromatic groups as described in this paragraph.

The group $R^1$ is advantageously an inertly substituted organic group. Preferably the group $R^1$ is an inertly substituted hydrocarbyl or poly(oxyalkylene) group having from about 2-20, preferably 2-10 carbon atoms. More preferably, $R^1$ is a $C_{2-4}$ alkyl group or a polymer of ethylene oxide, propylene oxide, butylene oxide or mixture thereof having 2-10 carbon atoms. Such polymer may be hydroxyl-terminated but is more preferably terminated with an alkyl group.

Suitable esters of terephthalic acid and trimellitic acid according to Structure II are the subject of the copending application Ser. No. 640,072, of S. A. Siegel entitled "Monomeric Elastomers for Halogen-Containing Resins" filed Aug. 10, 1984.

Also suitable are diesters represented by the structure

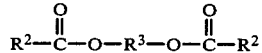

wherein each $R^2$ is independently an organic radical as defined hereinbefore and $R^3$ is an inertly substituted organic diradical.

The group $R^3$ is an inertly substituted organic diradical. Advantageously, the group $R^3$ is an alkylene diradical, a alkylene ether diradical or polyether diradical. The group $R^3$ advantageously contains from about 2-20, preferably 2-10 carbon atoms.

Exemplary esters include, for example, methyl stearate, ethyl stearate, methyl oleate, ethyl oleate, n-butyl oleate, t-butyl oleate, methyl laurate, ethyl laurate, methyl linoleate, ethyl linoleate, methyl palmitate and other fatty acid esters, methyl phthalate, ethyl phthalate, methoxy ethyl phthalate, ethoxyethylphthalate, di(ethoxyalkyl)phthalate, di(butoxyethyl)phthalate, di(butoxyethoxyethyl)phthalate, di(butoxyethyl)aliphate, dioctyl phthalate, di(butoxyethoxyethyl)adipate, di(butoxyethyl)glutinate, di(butoxyethyl)sebacate, dibutylterephthalate, and the like. Also suitable are diesters prepared from a hydroxyl terminated polyether and two moles of phthalic or terephthalic acid.

The additive of this invention can contain the aforementioned ionizable salt and enhancer in any ratio such that when an effective amount of the additive is incorporated into a polymer, the conductivity of the polymer is greater than that of a like polymer containing only the ionizable salt. Generally, the additive contains about 0.5–100, preferably about 1–25 moles of said enhancer per mole of ionizable salt.

The additive of this invention may be added to an organic polymer as a mixture of the foregoing components, or each of said component may be added separately to the polymer.

The organic polymer may be any into which the antistatic additive can be dispersed. The ability to disperse the antistatic additive is to a large extent dependent on the compatibility of the enhancer and the organic polymer. Accordingly, it is generally desirable to select the organic polymer and the enhancer together so that the two components are compatible. Alternatively, the antistatic agent and the organic polymer can be compatibilized by use of a cosolvent or other material which compatibilize the polymer and the antistatic agent.

Addition polymers and condensation polymers are useful herein as are either thermoplastic or thermosetting polymers. Exemplary of the polymers that are useful herein are polyolefins such as polyethylene, polypropylene and the like, polymers of conjugated dienes such as butadiene; poly(vinyl aromatics) such as polystyrene, poly(vinyl toluene) and the like; polycarbonates, acrylic resins such as polymers of acrylic and methacrylic acid and alkyl or hydroxylethyl esters thereof; polymers of vinyl chloride, vinylidene chloride or mixtures thereof; polyesters; copolymers of ethylene with carbon monoxide or vinyl alcohol; and polyurethanes or other polymers based on an organic polyisocyanate. Blends, alloys and copolymers of the foregoing polymer are also useful.

For the purpose of this invention the term polymers based on organic polyisocyanates and "organic polyisocyanate polymers" are understood to mean those which can be obtained by reaction of an organic polyisocyanate with an organic compound which contains at least two Zerewitinoff active hydrogen atoms, e.g. polycarbodiimides, polyisocyanurates, polyureas, polybiurets, polyamides, polyallophanates or polyurethanes or polymers containing a mixture of urethane, urea, allophanate, biuret, amide, carbodiimide and/or isocyanurate groups, and any other polymer based on a polyisocyanate. The process described here is particularly suitable for the production of polymers which contain urethane and urea groups prepared from a reaction mixture containing an organic polyisocyanate.

All such polymers based on organic polyisocyanates are also referred to herein by the shorthand term "polyurethanes".

In the preparation of polyurethane foams containing the additive of this invention, said additive is advantageously present in a reaction mixture of a polyahl (defined hereinafter) and a polyisocyanate. Since in preparing such reaction mixture it is preferable to add all the components in as few streams as possible, it is generally preferred to pre-mix the additive of this invention with the polyahl to form an active hydrogen-containing composition which is then reacted with the polyisocyanate.

The term "polyahl" as used herein, includes any polyfunctional compound having at least two active hydrogen atoms. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

The additive of this invention may be added to the polyahl as a mixture of the ionizable salt and the enhancer in the desired proportions or preferably as a "concentrate" comprising the additive dissolved or dispersed in a polyahl or mixture thereof. In such "concentrate", the concentration of additive is somewhat higher than that normally present in the active hydrogen-containing composition which is reacted with the polyisocyanate. Such concentrate normally contains from about 0.5–50, preferably 1–25, more preferably 1–10 percent by weight of the ionizable salt, and a corresponding amount of enhancer. A "B-side" for preparing polyurethanes typically contains about 0.015–20, preferably about 0.075–10 percent by weight of the ionizable salt.

If desired, each component of the additive of this invention may be added individually to the polyahl.

Sufficient of the additive of this invention is used to increase the conductivity of the product polymer. In general, the conductivity of the polymer is increased when the polymer contains from about 0.01–10, preferably 0.05–5 percent by weight of the ionizable salt. As stated hereinbefore, the polymer advantaeously contains from about 0.5–100, preferably 1–25 moles of the enhancer per mole ionizable salt.

In making a polyurethane polymer containing the additive of this invention, the polyahls, polyisocyanates, and other components, if any, are those conventionally employed in the preparation of polyurethane polymers.

Suitable polyahls include polyether polyols, polyester polyols, polyhydroxyl-containing phosphorous compounds, hydroxyl-terminated acetal resins, hydroxyl terminated amines and polyamines, the corresponding amine-terminated polyether and/or polyester polyols, the so-called polymer or copolymer polyols which comprise a dispersion of an addition polymer as copolymer in a continuous polyahl phase, as well as other active hydrogen-containing compounds which are known to be useful in the preparation of polyurethane polymers. Examples of these and other suitable polyahls are described more fully in U.S. Pat. No. 4,394,491, particularly in columns 3–5 thereof. Suitable copolymer polyols include those described in U.S. Pat. Nos. Re. 29,118, Re. 28,715 and 4,394,491.

The molecular weight and functionality of the polyahl will depend on the properties desired in the polyurethanes. For example, the formation of flexible polyurethanes is favored by using relatively high equivalent weight (ie. 250–10,000) polyahl and/or one having relatively low (2–4) functionality. More rigid polyurethanes are generally prepared from low equivalent weight (i.e. 50–250) polyahls and/or those having a high functionality (i.e. 3–16).

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'- biphenyl diisocyanate, 3,3'-dimethyl-4,4'-diphenyl diisocyanate, and 3,3'-dimethyldiphenylpropane-4,4',4'-diisocyanate; the triisocyanate polymethylene polyphenylisocyanate and tolylene-2,4,6-triisocyanate; and the tetraisocyanates such as 4,4'-dimethyldiphenylmethane-2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Especially preferred are methylene-bridged polyphenyl polyisocyanates, due to their ability to crosslink the polyurethane. The isocyanate index (ratio of equivalents of isocyanates to equivalents of active hydrogens) is advantageously from about 0.8-10, preferably about 1.0-4.0, more preferably 1.0-1.25.

Prepolymers or quasi-prepolymers of the foregoing polyisocyanates are also useful herein.

In addition to the aforementioned polyahl, polyisocyanate and additive, various additional components may be employed in preparing the polyurethane polymer.

The urethane reaction of polyisocyanate with a polyahl is advantageously carried out in the presence of an amount of urethane-type catalyst which is effective to catalyze the reaction of the polyahl with the polyisocyanate.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408. Catalyst for the trimerization of polyisocyanates, such as alkali metal alkoxides, may also optionally be employed herein.

If a polyurethane foam is to be prepared, a blowing agent is employed. Such blowing agent comprises an inert gas, a low boiling organic liquid such as methylene chloride or trichlorofluromethane, and/or a chemical blowing agent such as water, peroxides or azo compounds which react during the urethane polymerization reaction to generate a gas.

In preparing a polyurethane foam, a wetting agent(s) or surface-active agent(s) is generally necessary since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

Other optional components include conventional additives such as pigments, fillers, flame retardant, stabilizers, additional cell openers and the like.

Such catalysts, blowing agents, surfactants and other optional components are preferably blended with the polyahl before the reaction thereof with the polyisocyanate.

The resulting polyurethane polymer is substantially more conductive than a like polymer which does not contain the additive of this invention, or which contains only one of the two critical components of said additive.

In terms of conductivity, the additive of this invention, when incorporated into the polymer so that the polymer contains about 0.01-10% by weight of the ionizable salt, generally increases the conductivity of the polymer by about a factor of about 100 to 100 million ($10^2$-$10^9$).

The increased conductivity of the polymer containing the additive is also seen in its ability to dissipate a static charge. Although the polymer itself often is incapable of dissipating a static charge, the polymer containing the additive is able to rapidly dissipate static electricity. Often such polymer containing the additive can dissipate 99% of an applied static charge in a relatively short time, i.e. less than about 50, more preferably less than about 15, most preferably less than 2 seconds. Other methods are also useful to evaluate antistatic properties. In general, the advantages of this invention are obtained without significant adverse affects on the physical properties of the polymer.

The polymer containing the additive is useful, for example, as a "solid electrolyte" for batteries, and for preparing antistatic packaging or shelving for materials such as electronic devices which are sensitive to or damaged by a rapid discharge of static electricity, or exposure to static electrical fields. This invention is also useful in making adhesives, elastomers, rigid, semirigid and flexible foams, films, coatings and the like. Such materials are useful to prepare engineering handling equipment for explosive materials, antistatic carpet and other flooring and the like.

The following examples are provided to illustrate the invention and not to limit the scope thereof. All parts and percentages are by weight unless otherwise indicated.

EXAMPLE 1

A flexible polyurethane foam Sample No. 1 and Comparative Sample No. C-1 are prepared from the following base polyol formulation:

TABLE I

|  | Parts by Weight |
|---|---|
| Polyol[1] | 100 |
| Water | 3.6 |
| Surfactant[2] | 0.8 |
| Amine Catalyst[3] | 0.1 |
| Tin Catalyst[4] | 0.2 |

[1] A glycerine-initiated polyether polyol having an equivalent weight of about 1030.
[2] BF-2370, a polysiloxane surfactant sold by Goldschmidt Chemical Corp.
[3] Niax A-1, a tertiary amine catalyst sold by Union Carbide.
[4] T-9, an organotin catalyst sold by M-T Chemicals.

Sample No. 1 is prepared by adding 1.5 parts $ZnCl_2$ and 10 parts of a terephthalic diester (an enhancer) having the structure

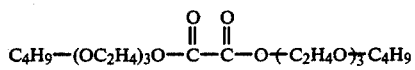

to the base polyol.

Comparative Sample No. C-1 is prepared by adding 10 parts of the terphthalic diester to the base polyol. Sample No. 1 and Comparative Sample No. C-1 are each reacted with 47.9 parts (108 index) toluene diisocyanate to form a flexible polyurethane foam.

The ability of each of these foams to dissipate a static charge is measured on an Electrotech Systems 406C static decay meter. The sample is conditioned at <15% relative humidity for >24 hours. A 5½"×3"<2" sample is placed into the meter at 72° F. and charged to +5000 VDC at 14% relative humidity. The time required for this charge to dissipate 99% of the charge is measured. The shorter the time required, the better the ability of the foam to dissipate the charge, and the more conductive the polymer.

The charge on Sample No. 1 is reduced to less than fifty volts in 1.36 seconds. When the test is repeated with an induced charge of (−)5000 VDC, 99% of the charge is dissipated in 1.68 seconds.

By contrast, Comparative Sample No. C-1 is so unconductive it cannot be evaluated using the foregoing technique. Thus, it is seen that the enhancer itself does not significantly increase the conductivity of the polymer. However, the additive of this invention substantially increases the conductivity thereof.

EXAMPLE 2

Polyurethane foam Sample No. 2 and Comparative Sample No. C-2 are prepared from the following components:

TABLE II

| Component | Parts By Weight | |
| --- | --- | --- |
| | Sample No. 2 | Comp. Sample No. C-2 |
| Polyol[1] | 100 | 100 |
| $H_2O$ | 3.6 | 3.6 |
| Surfactant[2] | 0.8 | 0.8 |
| Amine Catalyst[3] | 0.2 | 0.1 |
| Tin Catalyst[4] | 0.15 | 0.15 |
| NaSCN | 1.0 | 1.0 |
| Di(butoxyethyl)phthalate[5] | 10.0 | — |
| Toluene diisocyanate | 46.6 (108 index) | 46.6 (108 index) |

[1]A glycerine-initiated polyether polyol having an equivalent weight of about 1030.
[2]BF-2370, a polysiloxane surfactant sold by Goldschmidt Chemical Corp.
[3]Niax A-1, a tertiary amine catalyst sold by Union Carbide.
[4]T-9, an organotin catalyst sold by M-T Chemicals.
[5]Plasthall DBEA, available from C. P. Hall.

Foam Sample No. 2 is tested for static decay. It dissipates 99% of a +5000 volt charge in 0.51 seconds and 99% of −5000 volt charge in 0.32 seconds.

Comparative Sample No. C-2 is similarly tested. It requires 2.18 seconds to dissipate 99% of a +5000 volt charge and 3.59 seconds to dissipate 99% of a −5000 volt charge. Thus, the addition of the di(butoxyethyl)phthalate decreases the time required to dissipate the charge by about 75-90%.

EXAMPLE III

Polyurethane foam Sample No. 2 is duplicated, except 10 parts of dioctylphthalate are used in place of the di(butoxyethyl)phthalate. This foam dissipates 99% of a +5000 volt charge in 0.97 seconds and 99% of a −5000 volt charge in 0.76 seconds.

EXAMPLE IV

Polyurethane foam Sample No. 4 and Comparative Sample No. C-5 are prepared from the following components:

TABLE III

| Components | Parts by Weight | |
| --- | --- | --- |
| | Sample No. 4 | Comp. Sample No. C-5 |
| Polyol[1] | 100 | 100 |
| $H_2O$ | 3.6 | 3.6 |
| Surfactant[2] | 0.8 | 0.8 |
| Amine Catalyst[3] | 0.1 | 0.1 |
| Tin Catalyst[4] | 0.2 | 0.2 |
| NaSCN | 1.0 | — |
| Di(butoxyethyl phthalate) | 10.0 | — |
| Toluene diisocyanate | 46.6 (108 index) | 46.6 (108 index) |

[1]A glycerine-initiated polyether polyol having an equivalent weight of about 1030.
[2]BF-2370, a polysiloxane surfactant sold by Goldschmidt Chemical Corp.
[3]Niax A-1, a tertiary amine catalyst sold by Union Carbide.
[4]T-9, an organotin catalyst sold by M-T Chemicals.
[5]Plasthall DBEA, available from C. P. Hall.

The air flow, density, tensile strength, tear strength, elongation, resiliency, compression set (90%) indention force deflection (IFD), % hysteresis return, modulus, volume resistivity and static decay time are measured for each of Sample No. 4 and Comparative Sample No. C-5, with results as indicated in the following table.

TABLE IV

| Components | Parts by Weight | |
| --- | --- | --- |
| | Sample No. 4 | Comp. Sample No. C-5* |
| Air Flow ft$^3$/min[1] | 4.0 | 4.1 |
| Density, pcf[1] | 1.69 | 1.74 |
| Tensile strength, psi[1] | 18.3 | 21.5 |
| tear strength lb/in[1] | 3.1 | 2.9 |
| elongation %[1] | 260 | 240 |
| resiliency %[1] | 46 | 50 |
| compression set, 90%[1] | 4.5 | 2.1 |
| IFD[1] | | |
| 25% | 28 | 43 |
| 65% | 50 | 77 |
| Return 25% | 19 | 30 |
| % Hysteresis return[1] | 67 | 68 |
| Modulus[1] | 1.80 | 1.78 |
| Volume resistivity[2] | $1.5 \times 10^{10}$ | $>10^{12}$ |
| Static decay[3], sec | 0.32 | NM |

*Not an example of the invention.
NM - not meaningful since the sample is too nonconductive to test.
[1]ASTM D-3574
[2]ASTM D-257
[3]FTMS H 101, MIL-B-B1705B Method 4046

The foregoing data demonstrates that the inclusion of the additive of this invention does not significantly change most physical properties of the polymer in which it is contained, yet very substantially improves the conductivity thereof.

EXAMPLE V

Polyurethane foam Sample No. 5 is prepared from the following components

TABLE V

| | Parts by Weight |
| --- | --- |
| Polyol[1] | 107.8 |
| $H_2O$ | 3.6 |
| Surfactant[2] | 1.0 |
| Amine Catalyst | 0.2 |
| Tin Catalyst[4] | 0.1 |
| Sodium tetraphenylboride | 0.2 |
| Toluene diisocyanate | 108 index |

TABLE V-continued

| | Parts by Weight |
|---|---|
| di(butoxyethyl)phthalate | 5.0 |

The physical and static properties of this form are measured with results as indicated in Table VI.

TABLE VI

| Properties of Foam Sample No. 5 | |
|---|---|
| Air flow f$^3$/min. | 5.7 |
| Density pcf | 1.78 |
| Tensile Strength psi[1] | 17.5 |
| Tear Strength lb/in[1] | 3.1 |
| Elongation %[1] | 266 |
| Resiliency %[1] | 53 |
| Compression set, 90%[1] | 3.3 |
| IFD[1] | |
| 25% | 32 |
| 65% | 55 |
| Return 25% | 23 |
| % Hysteresis | 70 |
| Modulus[1] | 1.81 |
| Static Decay, sec | |
| <1% R.H. 0/79° F. | 0.4 |
| 13% R.H. /70° F. | 0.30 |

[1]ASTM D-3574

EXAMPLE VI

Comparative Sample No. C-6 is prepared by melt-blending 50 grams of an ethylene carbon monoxide copolymer (15 wt % CO) and 0.15 g sodium thiocyanate in a Haake-Buchler Rheocord System 40 blender for about 5 minutes at 200° C. Plaques are made from the mixture or a platen press heated to approximately 150° C.

In like manner, 50 g of the ECO copolymer, and 10 g of a mixture containing 15.1% dipropylene glycol, 70.7% di(butoxyethyl)phthalate 14.2% sodium thiocyanate are blended and formed into a plaque. This plaque is identified as Sample No. 6.

Both Sample No. 6 and Comparative Sample No. C-6 are evaluated for static dissipation according to the test described in Example 1, and for surface resistivity per ASTM D-257. The results are as indicated in Table VII.

TABLE VII

| | Sample No. 6 | Comp. Sample No. C-6 |
|---|---|---|
| Static decay, sec | 0.21 | 0.79 |
| Surface Resistivity | 2.84 × 10 | 4.37 × 10 |

Substantial improvement in both static decay and surface resistivity are seen with the invention.

We claim:

1. An organic polymer composition comprising an organic polymer having dispersed therein
   (a) a non-volatile ionizable metal salt and
   (b) an enhancer compound comprising a salt or ester of a carboxylic acid, which salt or ester contains about 6 to about 30 carbon atoms and is compatible with said organic polymer, and in which said metal salt is soluble, wherein from about 1 to about 25 moles of said enhancer are present per mole of ionizable metal salt.

2. The polymer composition of claim 1 wherein said enhancer compound increases the conductivity of said organic polymer in the presence of said ionizable metal salt, but does not substantially increase the conductivity of said organic polymer in the absence of said ionizable metal salt.

3. The polymer composition of claim 2 wherein the enhancer compound comprises a salt of a $C_8$–$C_{22}$ carboxylic.

4. The polymer composition of claim 2 wherein the enhancer compound comprises an ester of a $C_6$–$C_{30}$ dicarboxylic acid.

5. The polymer composition of claim 4 wherein the carboxylic acid is a $C_6$–$C_{12}$ aliphatic carboxylic acid.

6. The polymer composition of claim 4 wherein the carboxylic acid is an inertly substituted aromatic carboxylic acid.

7. The polymer composition of claim 6 wherein the ester is an alkyl or poly(oxyalkylene) ester of phthalic or terephthalic acid.

8. The polymer composition of claim 2 or 7 wherein the ionizable metal salt comprises an alkali metal thiocyanate.

9. The polymer composition of claims 2 or 7 wherein the ionizable metal salt is an alkali metal tetraphenylboride.

10. The polymer composition of claim 2 wherein the organic polymer comprises a polyurethane, a polyolefin, polyvinyl chloride, polyvinylidene chloride, a polyester, a poly(vinyl aromatic), an acrylonitrile-butadiene-styrene polymer a polycarbonate or a copolymer of an olefin with carbon monoxide or vinyl alcohol.

11. The polymer composition of claim 7 containing about 0.01–10 weight percent ionizable metal salt.

12. An active hydrogen containing composition comprising a polyahl or polyahls having dispersed therein
   (a) a non-volatile ionizable metal salt and
   (b) an enhancer comprising a salt or ester of a carboxylic acid containing about 6 to about 30 carbon atoms, wherein said ionizable salt and enhancer are present in an amount sufficient to increase the conductivity of an organic polyisocyanate polymer prepared from said active hydrogen containing composition, and wherein from about 1 to about 25 moles of said enhancer are present per mole of ionizable metal salt.

13. The active hydrogen containing composition of claim 12 further comprising a blowing agent and a catalyst for a reaction between said polyahl and an organic polyisocyanate.

14. The active hydrogen containing composition of claim 12 wherein said ionizable salt comprises from about 0.015–20 percent by weight of the active hydrogen containing composition.

15. The composition of claim 14 wherein said enhancer comprises an alkali metal salt of an unsaturated $C_6$–$C_{12}$ carboxylic acid.

16. The composition of claim 14 wherein the enhancer comprises an alkylene or polyoxyalkylene glycol diester of a $C_6$–$C_{12}$ dicarboxylic acid.

17. The composition of claim 16 wherein said enhancer comprises an ester of a poly(alkylene oxide) and phthalic or terephthalic acid.

18. The composition of claim 14 or 16 wherein the ionizable metal salt comprises an alkali metal thiocyanate.

19. The composition of claim 14 or 17 wherein the ionizable metal salt comprises an alkali metal tetraphenylborate.

20. An additive for increasing the conductivity of an organic polymer, comprising (a) a non-volatile ionizable metal salt and
(b) an enhancer which comprises a salt or ester of a carboxylic acid containing about 6 to about 30 carbon atoms, in which salt or ester said metal salt is soluble, which enhancer increases the conductivity of a polymer containing said ionizable salt, but which does not substantially increase the conductivity of said organic polymer in the substantial absence of said ionizable salt, and wherein from about 1 to about 25 moles of said enhancer are present per mole of ionizable metal salt.

21. The additive of claim 20 wherein the enhancer is a salt of a $C_6$–$C_{22}$ carboxylic acid.

22. The additive of claim 20 wherein the enhancer is an ester of a $C_6$–$C_{30}$ dicarboxylic acid.

23. The additive of claim 22 wherein the carboxylic acid comprises an aliphatic hydrocarbyl group containing 4–10 carbon atoms.

24. The additive of claim 22 wherein the carboxylic acid is an inertly substituted aromatic carboxylic acid.

25. The additive of claim 24 wherein the aromatic carboxylic acid is phthalic or terephthalic acid.

26. The additive of claim 25 wherein the ester is an alkyl or poly(oxyalkylene) ester of phthalic or terephthalic acid.

27. The additive of claim 20 containing from about 1–20 percent ionizable salt by weight.

28. The additive of claim 20 wherein the metal salt is an alkali metal thiocyanate.

29. A process for preparing an antistatic polymer, comprising reacting a polyahl with a polyisocyanate in the presence of the additive of claim 20.

* * * * *